United States Patent
Liu et al.

(10) Patent No.: US 11,243,840 B2
(45) Date of Patent: Feb. 8, 2022

(54) SYSTEM AND METHOD OF UTILIZING A RECOVERY OPERATING SYSTEM

(71) Applicant: Dell Products L.P., Round Rock, TX (US)

(72) Inventors: Wei G. Liu, Austin, TX (US); Rui Shi, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 143 days.

(21) Appl. No.: 16/299,467

(22) Filed: Mar. 12, 2019

(65) Prior Publication Data

US 2020/0293405 A1 Sep. 17, 2020

(51) Int. Cl.
*G06F 11/14* (2006.01)

(52) U.S. Cl.
CPC ...... *G06F 11/1438* (2013.01); *G06F 11/1417* (2013.01); *G06F 11/1482* (2013.01); *G06F 2201/82* (2013.01)

(58) Field of Classification Search
CPC ............ G06F 11/1438; G06F 11/1417; G06F 11/1482
See application file for complete search history.

(56) References Cited

U.S. PATENT DOCUMENTS

| | | | | |
|---|---|---|---|---|
| 8,214,653 | B1* | 7/2012 | Marr | G06F 8/65 713/189 |
| 8,381,264 | B1* | 2/2013 | Corddry | H04L 63/10 726/3 |
| 2004/0153724 | A1* | 8/2004 | Nicholson | G06F 11/1417 714/6.11 |
| 2004/0153733 | A1* | 8/2004 | Lin | G06F 11/1417 714/6.12 |
| 2004/0184309 | A1* | 9/2004 | Bress | G11B 19/04 365/154 |
| 2006/0085666 | A1* | 4/2006 | Stakutis | G06F 11/1417 714/2 |
| 2007/0143827 | A1* | 6/2007 | Nicodemus | H04L 63/102 726/2 |
| 2019/0163936 | A1* | 5/2019 | Pedrone | G06F 21/85 |

\* cited by examiner

*Primary Examiner* — Kamini B Patel
(74) *Attorney, Agent, or Firm* — Baker Botts L.L.P.

(57) ABSTRACT

In one or more embodiments, one or more methods, processes, and/or systems may modify a configuration of an information handling system (IHS) to prevent access of a first non-volatile memory medium, associated with the IHS, that stores a recovery operating system; may boot the information handling system from a second non-volatile memory medium of the IHS; may determine that at least one issue associated with a boot sequence has occurred; may modify the configuration of the IHS to provide access of the first non-volatile memory medium; may modify the configuration of the IHS to boot the information handling system from the first non-volatile memory medium; may restart the IHS; and may boot the recovery operating system from the first non-volatile memory medium.

20 Claims, 4 Drawing Sheets

SYSTEM AND METHOD OF UTILIZING A RECOVERY OPERATING SYSTEM

BACKGROUND

Field of the Disclosure

This disclosure relates generally to information handling systems and more particularly to utilizing a recovery operating system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more processes, methods, and/or systems may install a recovery operating system on a first non-volatile memory medium associated with an information handling system; may modify a configuration of the information handling system to prevent access of the first non-volatile memory medium; may boot the information handling system from a second non-volatile memory medium of the information handling system; may determine that at least one issue associated with a boot sequence has occurred; may determine if the at least one issue is included in a data structure; if the at least one issue is not included in the data structure, may provide issue information; and if the at least one issue is included in the data structure: may modify the configuration of the information handling system to provide access of the first non-volatile memory medium; may modify the configuration of the information handling system to boot the information handling system from the first non-volatile memory medium; may restart the information handling system; may access the recovery operating system from the first non-volatile memory medium; and may boot the recovery operating system from the first non-volatile memory medium. In one or more embodiments, the data structure may be stored in the second non-volatile memory medium.

In one or more embodiments, modifying the configuration of the information handling system to prevent access of the first non-volatile memory medium may include preventing access to an interface of the information handling system that is utilized to access the first non-volatile memory medium. In one example, the interface may include at least one of a peripheral component interconnect express (PCIe) interface of the information handling system, a serial advanced technology attachment (SATA) interface of the information handling system, a universal serial bus (USB) interface of the information handling system, a Thunderbolt interface of the information handling system, and a network interface of the information handling system, among others. In another example, the interface may include a PCIe interface. For instance, preventing access to the interface of the information handling system that is utilized to access the first non-volatile memory medium may include at least one of modifying a configuration of a PCIe root complex of the information handling system and modifying a configuration of a PCIe switch of the information handling system, among others. In one or more embodiments, modifying the configuration of the information handling system to prevent access of the first non-volatile memory medium may include preventing access to a port of the information handling system utilized to access the first non-volatile memory medium. For example, the port may include at least one of a SATA port, a PCIe port, a USB port, a Thunderbolt port, and an Ethernet port, among others.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
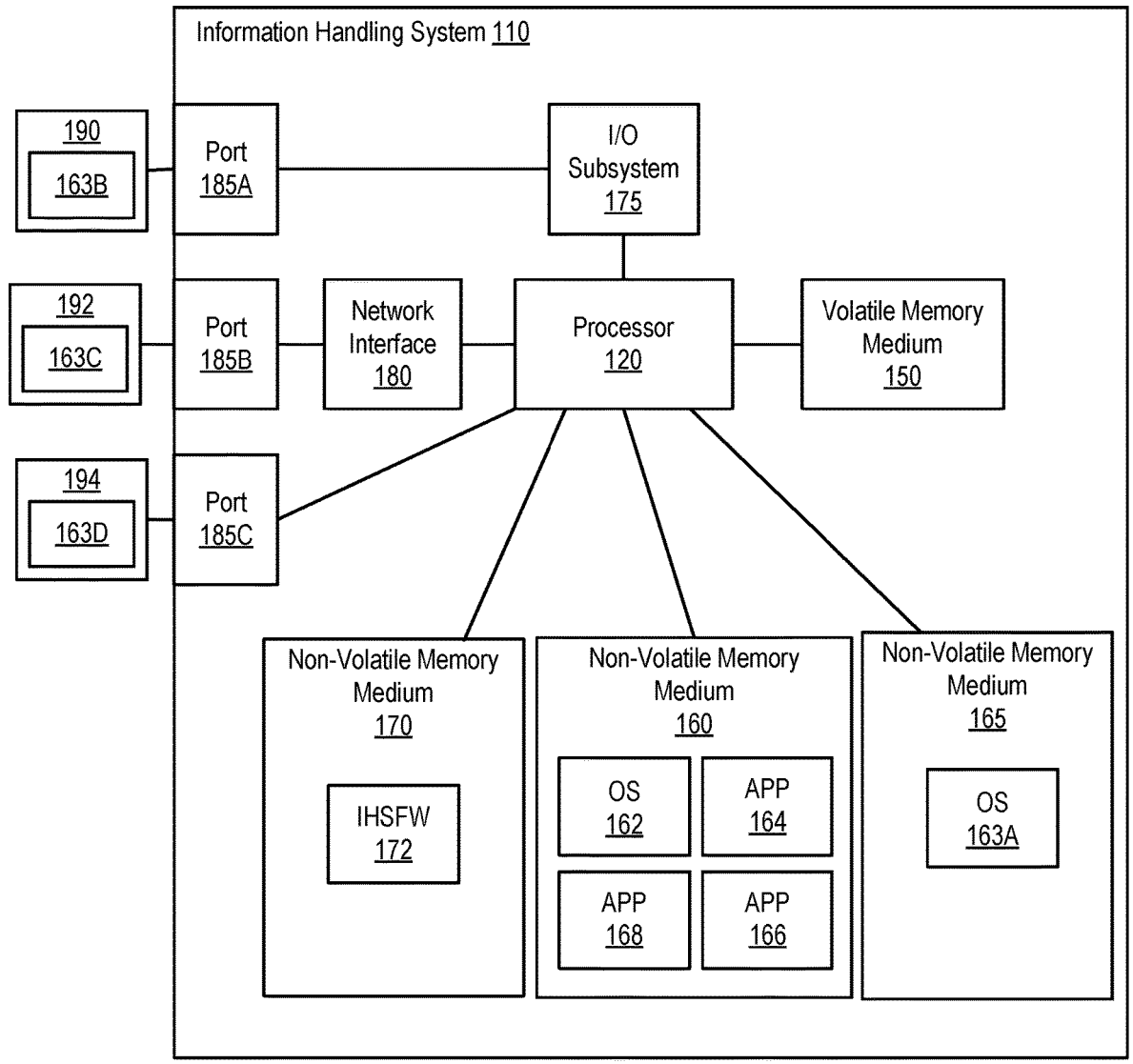
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an operating system (OS) image may be a target of one or more infiltration attempts. For example, a cyber attack may target an OS image that an information handling system utilizes to boot the information handling system. For instance, the cyber attack may target multiple boot OS images of respective information handling systems of a data center. In one or more embodiments, one or more system administrators (e.g., one or more people) may install or reinstall an OS image on one or more information handling systems after a compromise of the one or more information handling systems. For example, the one or more information handling systems may have been targeted in one or more cyber attacks. In one or more embodiments, the one or more system administrators may provide an OS image to the one or more information handling systems after the one or more cyber attacks. In one example, the one or more system administrators may physically provide an OS image to the one or more information handling systems. In another example, the one or more system administrators may provide an OS image to the one or more information handling systems via a network.

In one or more embodiments, after the one or more information handling system have been compromised, providing an OS image to the one or more information handling systems via a network may be faster than physically providing the OS image to the one or more information handling systems. In one or more embodiments, if the one or more information handling systems already included an uncompromised OS image, utilizing the uncompromised OS image may be faster than providing an uncompromised OS image either physically or via a network. For example, this may minimize down time of the one or more information handling systems. For instance, when down time is minimized, compute time of the one or more information handling systems may be maximized. In one or more embodiments, maximizing compute time of the one or more information handling systems may improve one or more utilizations of the one or more information handling systems. For example, maximizing compute time of the one or more information handling systems may improve performance of the one or more information handling systems over a period of time.

In one or more embodiments, information handling system firmware (IHSFW) may include a default boot process. For example, the IHSFW may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. For instance, the default boot process may attempt to boot from a next entry in a boot list if a primary boot device fails to boot an information handling system. In one or more embodiments, the boot process may not account for corruption and/or compromise of boot devices associated with next boot devices in the boot list. For example, the boot list may be available to malware and/or during a cyber attack. For instance, boot devices associated with the boot list may be susceptible to corruption and/or compromise. In one or more embodiments, a boot process may fail if there is no next boot device in the boot list.

In one or more embodiments, a boot device may be hidden. In one example, the boot device may include an OS image. In another example, the boot device may include instructions executable by at least one processor of an information handling system to boot the information handling system. In one or more embodiments, the IHSFW may cause the boot device to be visible. For example, the IHSFW may "unhide" the boot device that was previously hidden. In one instance, the IHSFW may boot to the boot device that was previously hidden if the IHSFW determines that a primary boot device has been corrupted and/or compromised. In another instance, the IHSFW may boot to the boot device that was previously hidden if the IHSFW determines one or more issues and/or one or more errors associated with the primary boot device.

In one or more embodiments, a determination that a primary boot device may not be utilized to boot an information handling system may be based at least on one or more issues and/or one or more errors associated with the primary boot device. In one example, the one or more issues and/or the one or more errors associated with the primary boot device may include a secure boot failure. For instance, a secure boot failure may include one or more corruptions and/or one or more compromises associated with a primary OS image. In a second example, the one or more issues and/or the one or more errors associated with the primary boot device may include an impediment (e.g., a hang) to booting from the primary boot device. For instance, IHSFW may include a three-strike counter that is associated with boot attempts associated with the primary boot device. In a third example, the one or more issues and/or the one or more errors associated with the primary boot device may include consecutive non-maskable interrupts (NMIs) associated with the primary boot device. In one instance, the IHSFW may determine if a number (e.g., three) of consecutive NMIs occur with the primary boot device. In another instance, a system management interrupt (SMI) handler may determine if a number (e.g., three) of consecutive NMIs occur with the primary boot device. In another example, the one or more issues and/or the one or more errors associated with the primary boot device may include one or more expirations of a timer. For instance, the IHSFW may determine if a number (e.g., three) expirations of a watchdog timer (WDT) have occurred.

In one or more embodiments, the IHSFW may store system event log (SEL) event information if it is determined that the primary boot device may not be utilized to boot the information handling system. For example, storing the SEL event information may include logging the SEL event information. In one or more embodiments, if it is determined that the primary boot device may not be utilized to boot the information handling system, the IHSFW may automatically failover to the boot device that was previously hidden. For example, the IHSFW may cause the hidden boot device to be visible and automatically failover to the boot device that was previously hidden if it is determined that the primary boot device may not be utilized to boot the information handling system.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160, 165, and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160, 165, and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160, 165, and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160, 165, and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150-170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an OS 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 165 may include an OS 163A. In one or more embodiments, OS 163 may include processor instructions executable by processor 120. In one example, processor 120 may execute processor instructions of OS 163A via non-volatile memory medium 165. In another example, one or more portions of the processor instructions of the one or more of OS 163 may be transferred to volatile memory medium 150, and processor 120 may execute the one or more portions of the processor instructions of OS 163 via volatile memory medium 150. In one or more embodiments, OS 163 may be or include a boot image. For example, OS 163 may be or include a recovery boot image. In one or more embodiments, non-volatile memory medium 165 may be hidden.

As shown, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a BIOS, an EFI, a UEFI, and an ACPI, among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

As illustrated, IHS 110 may include ports 185A-185C coupled to processor 120. As shown, port 185A may be coupled to processor 120 via I/O subsystem 175. As illustrated, port 185B may be coupled to processor 120 via network interface 180. As shown, memory media 190-194 may be coupled to ports 185A-185C, respectively. In one or more embodiments, a memory medium of memory media 190-194 may include a non-volatile memory medium. As illustrated, memory media 190-194 may include operating systems (OSs) 163B-163D, respectively. In one or more embodiments, a port 185 may include at least one of an Ethernet port, a USB port, a SATA port (e.g., an external SATA port), a PCIe port, and a Thunderbolt port, among others. In one or more embodiments, one or more of an Ethernet port, a USB port, a SATA port, a PCIe port, and a Thunderbolt port, among others, may be internal to IHS 110. In one or more embodiments, one or more of an Ethernet port, a USB port, a SATA port, a PCIe port, and a Thunderbolt port, among others, may be one or more respective external ports of IHS 110.

Figure 2:
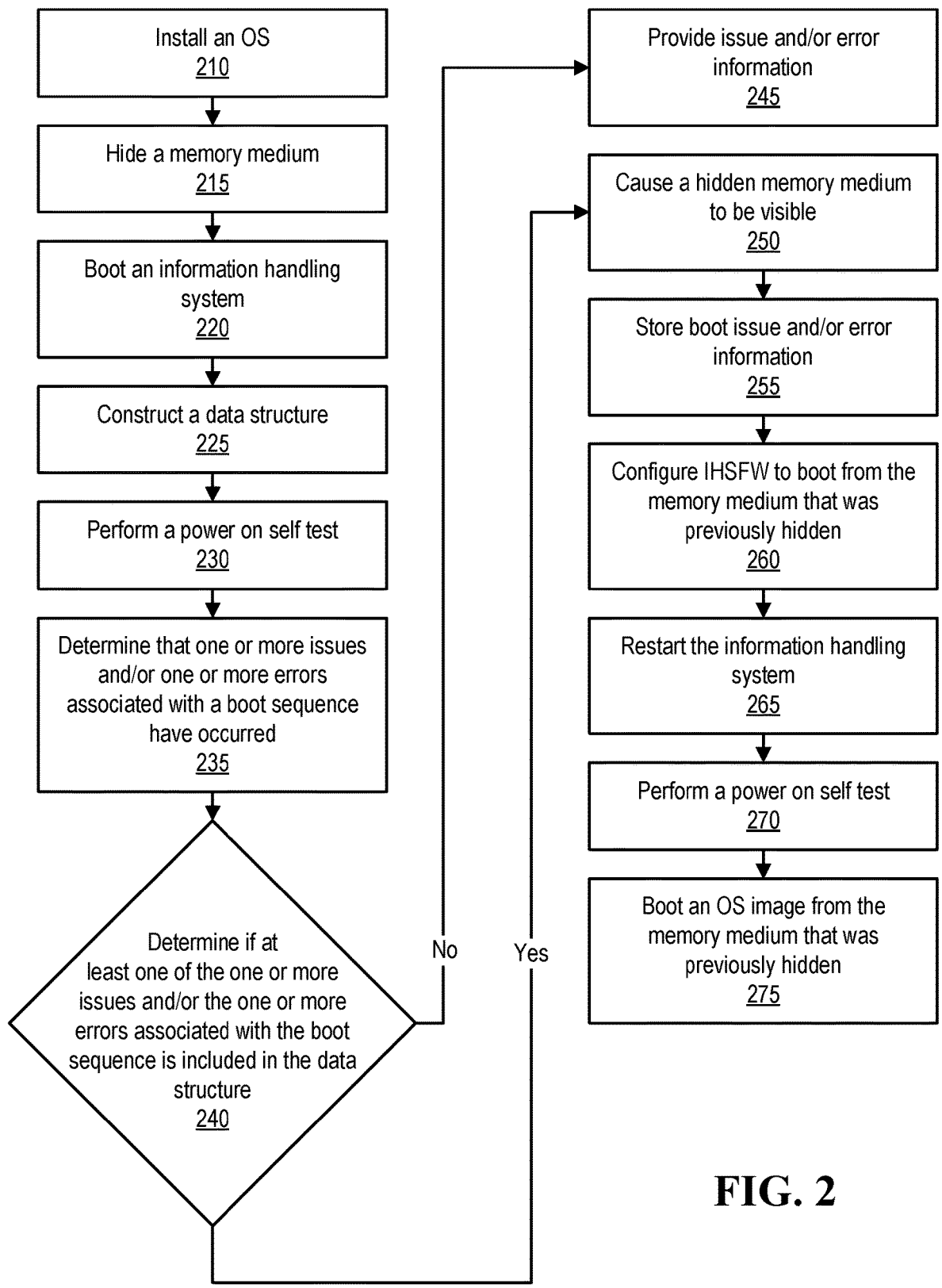
FIG. 2 illustrates an example of a method of operating an information handling system, according to one or more embodiments.

Turning now to FIG. 2, an example of a method of operating an information handling system is illustrated, according to one or more embodiments. At 210, an OS may be installed. For example, OS 163 may be installed. In one instance, OS 163A may be installed on non-volatile memory medium 165. In a second instance, OS 163B may be installed on non-volatile memory medium 190. In a third instance, OS 163C may be installed on non-volatile memory medium 192. In another instance, OS 163D may be installed on non-volatile memory medium 194. In one or more embodiments, OS 163 may be or include an OS image. For example, OS 163 may be or include a recovery OS image. In one or more embodiments, OS 163 may include one or more structures and/or one or more functionalities of those described with reference to OS 162. In one or more embodiments, installing the OS may include copying OS 163 to and/or storing OS 163 on a non-volatile memory medium.

At 215, a memory medium may be hidden. In one or more embodiments, the memory medium may be or include a non-volatile memory medium. In one example, the memory medium may be or include non-volatile memory medium 165. In a second example, the memory medium may be or include non-volatile memory medium 190. In a third example, the memory medium may be or include non-volatile memory medium 192. In another example, the memory medium may be or include non-volatile memory medium 194. In one or more embodiments, hiding the memory medium may include hiding an interface that may be utilized to access the memory medium. In one example, a SATA interface associated with the memory medium may be hidden. For instance, a SATA port associated with the memory medium may be hidden. In a second example, a PCIe interface associated with the memory medium may be hidden. In another example, a USB interface associated with the memory medium may be hidden. For instance, a USB port associated with the memory medium may be hidden.

Figure 3:
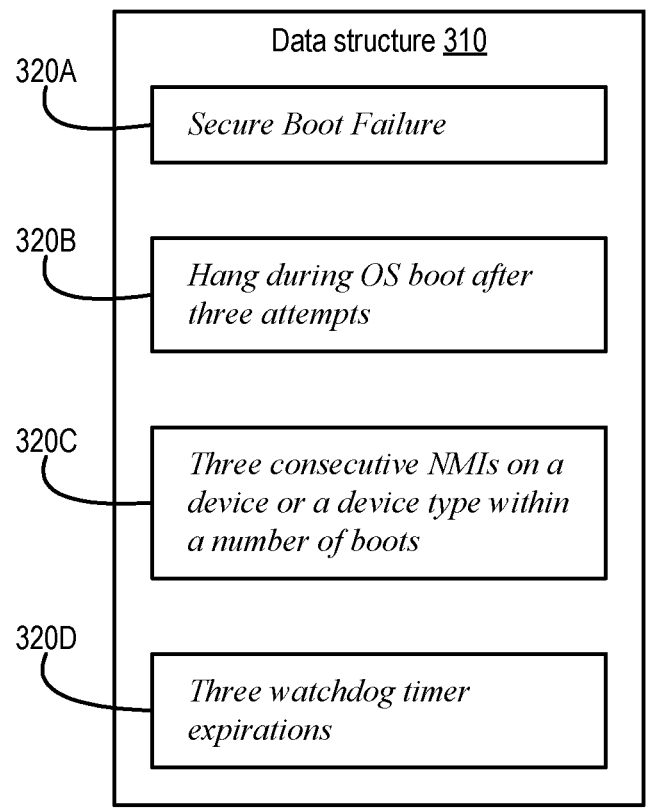
FIG. 3 illustrates an example of a data structure.

At 220, an information handling system may be booted. For example, IHS 110 may be booted. For instance, booting IHS 110 may include IHS 110 executing IHSFW 172. At 225, a data structure may be constructed. For example, a data structure 310 (illustrated in FIG. 3) may be constructed. In one or more embodiments, data structure 310 may include one or more of a lookup table, a hash table, an array, a linked list, a database, and a tree, among others. In one or more embodiments, IHSFW 172 construct data structure 310. In one or more embodiments, constructing data structure 310 may include populating data structure 310. For example, data structure 310 may be populated with information. For instance, data structure 310 may be populated with entries 320A-320D that include information. In one or more embodiments, data structure 310 may be stored in one or more memory media of IHS 110. For example, data structure 310 may be stored in one or more of memory media 150, 160, and 170, among others.

In one or more embodiments, the information may include one or more issues and/or one or more errors associated with a boot sequence that may prevent utilization of OS 163. In one example, the one or more issues and/or the one or more errors associated with the boot sequence may include a secure boot failure (e.g., entry 320A). For instance, a secure boot failure may include one or more corruptions and/or one or more compromises associated with a primary OS image (e.g., OS 162). In a second example, the one or more issues and/or the one or more errors associated with the boot sequence may include an impediment (e.g., a hang) to booting from a primary OS image (e.g., entry 320B). For instance, IHSFW 172 may include a three-strike counter that is associated with boot attempts associated with the boot sequence. In a third example, the one or more issues and/or the one or more errors associated with the boot sequence may include consecutive NMIs associated with the boot sequence (e.g., entry 320C). In one instance, IHSFW 172 may determine if a number (e.g., three) of consecutive NMIs occur with the boot sequence. In another instance, a SMI handler may determine if a number (e.g., three) of consecutive NMIs occur with the boot sequence. In another example, the one or more issues and/or the one or more errors associated with the boot sequence may include one or more expirations of a timer (e.g., entry 320D). For instance, IHSFW 172 may determine if a number (e.g., three) expirations of a WDT have occurred.

In one or more embodiments, the information may include one or more issues and/or one or more errors associated with a boot sequence that may cause utilization of OS 163. In one example, the one or more issues and/or the one or more errors associated with the boot sequence may include a secure boot failure (e.g., entry 320A). For instance, a secure boot failure may include one or more corruptions and/or one or more compromises associated with a primary OS image (e.g., OS 162). In a second example, the one or more issues and/or the one or more errors associated with the boot sequence may include an impediment (e.g., a hang) to booting from a primary OS image (e.g., entry 320B). For instance, IHSFW 172 may include a three-strike counter that is associated with boot attempts associated with the boot sequence. In a third example, the one or more issues and/or the one or more errors associated with the boot sequence may include consecutive NMIs associated with the boot sequence (e.g., entry 320C). In one instance, IHSFW 172 may determine if a number (e.g., three) of consecutive NMIs occur with the boot sequence. In another instance, a SMI handler may determine if a number (e.g., three) of consecutive NMIs occur with the boot sequence. In another example, the one or more issues and/or the one or more errors associated with the boot sequence may include one or more expirations of a timer (e.g., entry 320D). For instance, IHSFW 172 may determine if a number (e.g., three) expirations of a WDT have occurred.

At 230, a power on self test (POST) may be performed. At 235, it may be determined that one or more issues and/or one or more errors associated with a boot sequence have occurred. In one or more embodiments, an error handler may determine if one or more issues and/or one or more errors associated with a boot sequence has occurred. For example, a system management mode (SMM) may include the error handler. In one instance, a SMM handler may be or include the error handler. In a second instance, a SMI handler may be or include the error handler. In another instance, the error handler may be or include a SMI handler. In one or more embodiments, the error handler may utilize the data structure in determining that the one or more issues and/or the one or more errors associated with the boot sequence have occurred. For example, the error handler may utilize data structure 310 in determining that the one or more issues and/or the one or more errors associated with the boot sequence have occurred. At 240, it may be determined if at least one of the one or more issues and/or the one or more errors associated with the boot sequence is included in the data structure. For example, the error handler may determine if at least one of the one or more issues and/or the one or more errors associated with the boot sequence is included in the data structure. For instance, the error handler may determine if at least one of the one or more issues and/or the one or more errors associated with the boot sequence is included in data structure 310.

If the at least one of the one or more issues and/or the one or more errors associated with the boot sequence is not included in the data structure, issue and/or error information may be provided, at 245. In one example, providing the issue and/or error information may include providing the issue and/or error information to a display. For instance, the display may be coupled to the information handling system. In a second example, providing the issue and/or error information may include providing the issue and/or error information to a network. In a third example, providing the issue and/or error information may include incrementing an error count. In a fourth example, providing the issue and/or error information may include storing the issue and/or error information. In one instance, storing the issue and/or error information may include logging the issue and/or error information. In a second instance, storing the issue and/or error information may include storing the issue and/or error information via the data structure and/or modifying the data structure with the issue and/or error information. In another instance, storing the issue and/or error information may include clearing one or more flags in the data structure and/or modifying the data structure. After storing the issue and/or error information, the issue and/or error information may be utilized in a subsequent boot process, according to one or more embodiments. In another example, providing the issue and/or error information may include providing the issue and/or error information to a remote access controller. For instance, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC).

In one or more embodiments, a remote access controller may include one or more of a processor, and a memory, a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. For example, the remote access controller may be based at least on an Intelligent Platform Management Interface (IPMI) standard. For instance, the remote access controller may allow and/or permit utilization of IPMI out-of-band interfaces such as IPMI Over LAN (local area network). In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, the information handling system may hang after the issue and/or error information has been provided.

If the at least one of the one or more issues and/or the one or more errors associated with the boot sequence is included in the data structure, a hidden memory medium may be caused to be visible, at 250. For example, the memory medium that was hidden at 215 may be caused to be visible. For instance, non-volatile memory medium 165 may be caused to be visible. In one or more embodiments, causing the memory medium to be visible may include causing the memory medium to be accessible by one or more of IHSFW 172 and processor 120, among others. In one or more embodiments, causing a memory medium to be visible may include causing an interface that may be utilized to access the memory medium to be visible. In one example, a SATA interface associated with the memory medium may be caused to be visible. For instance, a SATA port associated with the memory medium may be caused to be visible. In a second example, a PCIe interface associated with the memory medium may be caused to be visible. In another example, a USB interface associated with the memory medium may be caused to be visible. For instance, a USB port associated with the memory medium may be caused to be visible. In one or more embodiments, causing a hidden memory medium to be visible may include causing the hidden memory medium to be accessible by at least one processor of an information handling system. In one or more embodiments, causing a hidden memory medium to be visible may include causing the hidden memory medium to be discoverable via a search.

In one or more embodiments, causing the memory medium to be visible may include a PCH causing the memory medium to be visible. In one or more embodiments, causing the memory medium to be visible may include causing a PCIe root port associated with the memory medium to be visible. For example, causing the interface associated with the memory medium to be visible may include configuring a PCIe root complex to cause PCIe root port associated with the memory medium to be visible. In one or more embodiments, causing an interface associated with the memory medium to be visible may include IHSFW 172 causing the interface associated with the memory medium to be visible.

At 255, boot issue and/or error information may be stored. In one or more embodiments, storing boot issue and/or error information may include logging the boot issue and/or error information. In one or more embodiments, IHSFW 172 may store the boot issue and/or error information. For example, IHSFW 172 may store SEL event information that may include the boot issue and/or error information. For instance, storing the SEL event information may include logging the SEL event information.

At 260, IHSFW may be configured to boot from the memory medium that was previously hidden. For example, IHSFW 172 may be configured to boot from the memory medium that was previously hidden. In one instance, the error handler may configure IHSFW 172 to boot from non-volatile memory medium 165. In a second instance, the error handler may configure IHSFW 172 to boot from non-volatile memory medium 190. In a third instance, the error handler may configure IHSFW 172 to boot from non-volatile memory medium 192. In another instance, the error handler may configure IHSFW 172 to boot from non-volatile memory medium 194. In one or more embodiments, configuring the IHSFW to boot from the memory medium that was previously hidden may include setting a flag. For instance, the flag may indicate that the information handling system may boot from the memory medium that was previously hidden. In one or more embodiments, the flag may indicate that the information handling system may only boot from the memory medium that was previously hidden. For example, the information handling system may only boot from the memory medium that was previously hidden. For instance, the information handling system may be forced to boot from the memory medium that was previously hidden.

In one or more embodiments, configuring the IHSFW to boot from the memory medium that was previously hidden may include incrementing a counter. For example, the counter may indicate a number of boots utilizing the memory medium that was previously hidden. For instance, the counter may indicate a number of boots utilizing OS 163. In one or more embodiments, configuring the IHSFW to boot from the memory medium that was previously hidden may be performed in response to determining that at least one of the one or more issues and/or the one or more errors associated with the boot sequence is included in the data structure.

At 265, the information handling system may be restarted. For example, IHS 110 may be restarted. In one instance, IHSFW 172 may restart IHS 110. In another instance, the error handler may restart IHS 110. In one or more embodiments, restarting the information handling system may include rebooting the information handling system. At 270, a power on self test may be performed. At 275, an OS image stored on the previously hidden memory medium may be booted. In one example, OS 163A, stored on non-volatile memory medium 165, may be booted. In a second example, OS 163B, stored on non-volatile memory medium 190, may be booted. In a third example, OS 163C, stored on non-volatile memory medium 192, may be booted. In another example, OS 163D, stored on non-volatile memory medium 194, may be booted.

Figure 4:
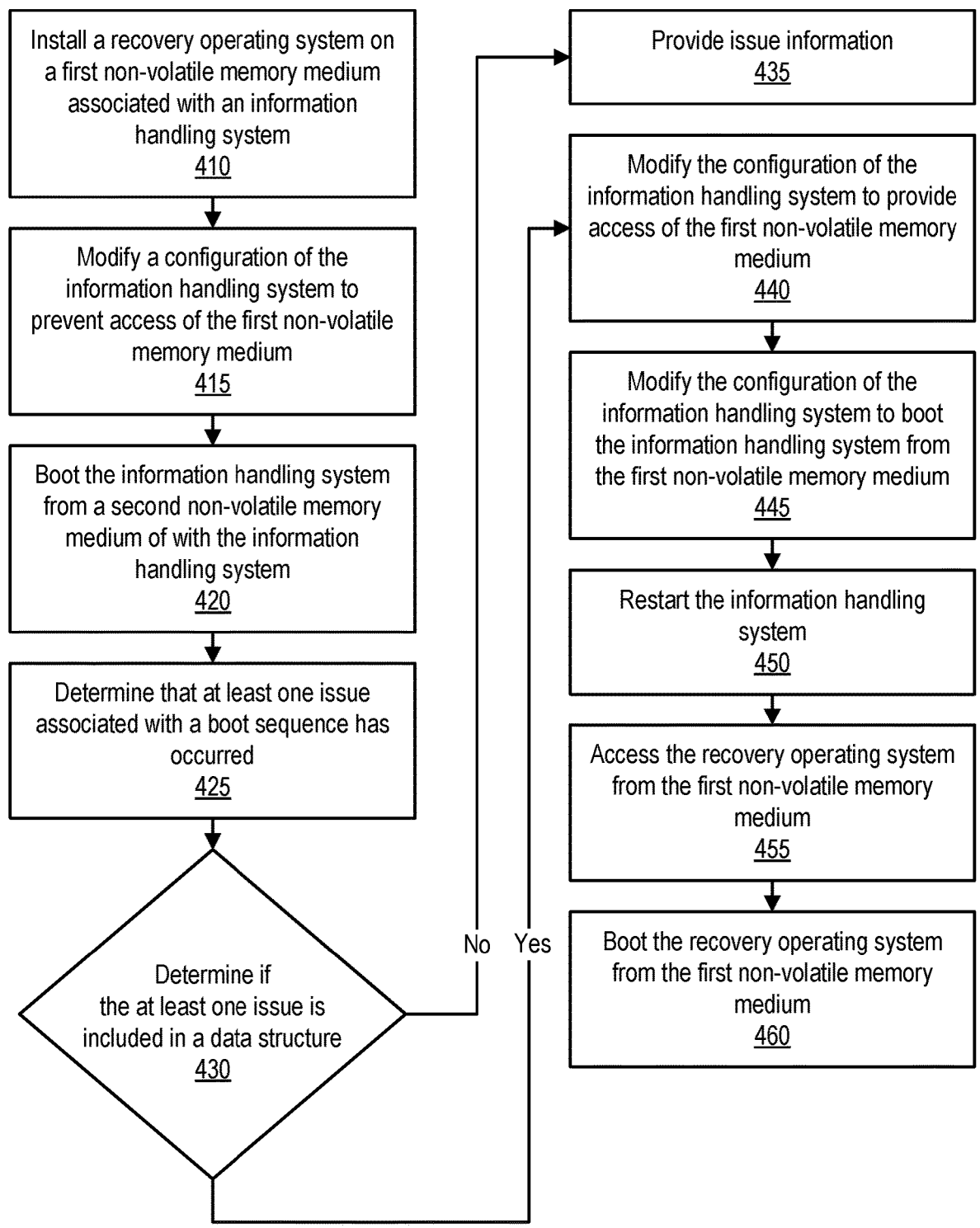
FIG. 4 illustrates another example of a method of operating an information handling system, according to one or more embodiments.

Turning now to FIG. 4, another example of a method of operating an information handling system is illustrated, according to one or more embodiments. At 410, a recovery operating system may be installed on a first non-volatile memory medium associated with an information handling system. In one example, the first non-volatile memory medium may be or include non-volatile memory medium 165. For instance, OS 163A may be install on non-volatile memory medium 165. In a second example, the first non-volatile memory medium may be or include non-volatile memory medium 190. For instance, OS 163B may be install on non-volatile memory medium 190. In a third example, the first non-volatile memory medium may be or include non-volatile memory medium 192. For instance, OS 163C may be install on non-volatile memory medium 192. In another example, the first non-volatile memory medium may be or include non-volatile memory medium 194. For instance, OS 163D may be install on non-volatile memory medium 194.

In one or more embodiments, the information handling system may include the first non-volatile memory medium. For example, IHS 110 may include non-volatile memory medium 165. In one or more embodiments, the first non-volatile memory medium may be external to the information handling system. For example, the first non-volatile memory medium may be coupled to the information handling system. In one instance, non-volatile memory medium 190 may be external to IHS 110 and may be coupled IHS 110. In a second instance, non-volatile memory medium 192 may be external to IHS 110 and may be coupled IHS 110. In another instance, non-volatile memory medium 194 may be external to IHS 110 and may be coupled IHS 110.

At 415, a configuration of the information handling system may be modified to prevent access of the first non-volatile memory medium. In one or more embodiments, modifying the configuration of the information handling system to prevent access of the first non-volatile memory medium may include hiding the first non-volatile memory medium. For example, the first non-volatile memory medium may be hidden from at least one processor of the information handling system. In one or more embodiments, modifying the configuration of the information handling system to prevent access of the first non-volatile memory medium may include preventing access to an interface of the information handling system that is utilized to access the first non-volatile memory medium. For example, the interface may include at least one of a PCIe interface of the information handling system, a SATA interface of the information handling system, a USB interface of the information handling system, a Thunderbolt interface of the information handling system, and a network interface of the information handling system, among others.

In one or more embodiments, the preventing access to the interface of the information handling system that is utilized to access the first non-volatile memory medium may include modifying a PCH to prevent access to the interface of the information handling system that is utilized to access the first non-volatile memory medium. In one or more embodiments, the preventing access to the interface of the information handling system that is utilized to access the first non-volatile memory medium may include at least one of modifying a configuration of a PCIe root complex of the information handling system and modifying a configuration of a PCIe switch of the information handling system, among others. In one or more embodiments, modifying the configuration of the information handling system to prevent access of the first non-volatile memory medium may include preventing access to a port of the information handling system utilized to access the first non-volatile memory medium. For example, the port may include at least one of a SATA port, a PCIe port, a USB port, a Thunderbolt port, and an Ethernet port, among others.

At 420, the information handling system may be booted from a second non-volatile memory medium of the information handling system. For example, the second non-volatile memory medium may be or include non-volatile memory medium 160. For instance, IHS 110 may boot OS 162. At 425, it may be determined that at least one issue associated with a boot sequence has occurred. For example, an error handler may determine that at least one issue associated with a boot sequence has occurred. In one or more embodiments, a SMI handler may include the error handler. In one or more embodiments, IHSFW 172 may include the error handler. In one or more embodiments, an issue may be or include an error.

At 430, it may be determined if the at least one issue is included in a data structure. For example, the error handler may determine if the at least one issue is included in a data structure. For instance, the data structure may be or include data structure 310. In one or more embodiments, the data structure may be stored in the second non-volatile memory medium. For example, data structure 310 may be stored in non-volatile memory medium 170. For instance, data structure 310 may be stored in a non-volatile memory medium that store IHSFW 172. In one or more embodiments, the data structure may be stored in a third non-volatile memory medium. For example, the third non-volatile memory medium may be or include non-volatile memory medium 160. For instance, the data structure may be stored in non-volatile memory medium 170. In one or more embodiments, the data structure may be stored in a volatile memory medium. For example, the volatile memory medium may be or include volatile memory medium 150. For instance, the data structure may be stored in volatile memory medium 150.

If the at least one issue is not included in the data structure, issue information may be provided, at 435. In one or more embodiments, method element 435 may be performed in accordance with method element 245 of FIG. 2. If the at least one issue is included in the data structure, the configuration of the information handling system may be modified to provide access of the first non-volatile memory medium, at 440.

In one or more embodiments, modifying the configuration of the information handling system to provide access of the first non-volatile memory medium may include making the first non-volatile memory medium visible. For example, the first non-volatile memory medium may caused to be visible to at least one processor of the information handling system. For instance, non-volatile memory medium 165 may be caused to be visible processor 120. In one or more embodiments, modifying the configuration of the information handling system to provide access of the first non-volatile memory medium may include providing access to an interface of the information handling system that is utilized to access the first non-volatile memory medium. For example, the interface may include at least one of a PCIe interface of the information handling system, a SATA interface of the information handling system, a USB interface of the information handling system, a Thunderbolt interface of the information handling system, and a network interface of the information handling system, among others.

In one or more embodiments, providing access to the interface of the information handling system that is utilized to access the first non-volatile memory medium may include modifying a configuration of a PCH of the information handling system. In one or more embodiments, providing access to the interface of the information handling system that is utilized to access the first non-volatile memory medium may include at least one of modifying a configuration of a PCIe root complex of the information handling system and modifying a configuration of a PCIe switch of the information handling system, among others. In one or more embodiments, modifying the configuration of the information handling system to provide access of the first non-volatile memory medium may include providing access to a port of the information handling system utilized to access the first non-volatile memory medium. For example, the port may include at least one of a SATA port, a PCIe port, a USB port, a Thunderbolt port, and an Ethernet port, among others.

At 445, the configuration of the information handling system may be modified to boot the information handling system from the first non-volatile memory medium. In one example, at least a portion of non-volatile memory medium 170 may be modified to boot IHS 110 from the first non-volatile memory medium. In another example, at least a portion of IHSFW 172 may be modified to boot IHS 110 from the first non-volatile memory medium.

At 450, the information handling system may be restarted. In one example, restarting the information handling system may include power cycling at least one processor of the information handling system. For instance, processor 120 may be power cycled. In another example, restarting the information handling system may include rebooting the information handling system. For instance, IHS 110 may be rebooted.

At 455, the recovery operating system may be accessed from the first non-volatile memory medium. In one example, OS 163A may be accessed from non-volatile memory medium 165. In a second example, OS 163B may be accessed from non-volatile memory medium 190. In a third example, OS 163C may be accessed from non-volatile memory medium 192. In another example, OS 163D may be accessed from non-volatile memory medium 194.

At 460, the recovery operating system may be booted from the first non-volatile memory medium. In one example, OS 163A may be booted from non-volatile memory medium 165. For instance, IHS 110 may boot OS 163A from non-volatile memory medium 165. In a second example, OS 163B may be booted from non-volatile memory medium 190. For instance, IHS 110 may boot OS 163B from non-volatile memory medium 190. In a third example, OS 163C may be booted from non-volatile memory medium 192. For instance, IHS 110 may boot OS 163C from non-volatile memory medium 192. In another example, OS 163D may be booted from non-volatile memory medium 192. For instance, IHS 110 may boot OS 163D from non-volatile memory medium 194.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
at least one processor; and
a memory medium, coupled to the at least one processor, that stores instructions executable by the at least one processor, which when executed by the at least one processor, cause the information handling system to:
install a recovery operating system on a first non-volatile memory medium associated with the information handling system;
store a second operating system and a data structure comprising information associated with a plurality of possible errors of a boot sequence in a second non-volatile memory medium of the information handling system, wherein the information associated with a plurality of possible errors include information corresponding to a corruption of a primary OS image for a secure boot failure, a plurality of boot attempts associated with an impediment to booting from a primary boot device, and a plurality of consecutive non-maskable interrupts (NMIs) associated with a primary boot device;
modify a configuration of the information handling system to prevent access of the first non-volatile memory medium, wherein the first non-volatile memory medium is not discoverable via a search;
start a power on self test (POST) by the second operating system, wherein the second operating system is configured to boot the information handling system from the second non-volatile memory medium of the information handling system;
determine that at least one issue associated with a boot sequence has occurred, the at least one issue comprising a secure boot failure, a hang, or a non-maskable interrupt (NMI) associated with the second non-volatile memory medium;
determine if information associated with the at least one issue matches information associated with an error of the plurality of possible errors stored in the data structure;
if the at least one issue does not match information associated with an error of the plurality of possible errors stored in the data structure, provide issue information; and
if the information associated with the issue matches the information associated with a corruption of the primary OS, the number of boot attempts matches the plurality of boot attempts associated with an impediment to booting from a primary boot device or a number of consecutive NMIs matches the plurality of consecutive non-maskable interrupts (NMIs) associated with the primary boot device stored in the data structure:
modify the configuration of the information handling system to provide access of the first non-volatile memory medium;
modify the configuration of the information handling system to boot the information handling system using the recovery operating system from the first non-volatile memory medium;

restart the information handling system;
access the recovery operating system from the first non-volatile memory medium; and
reboot the information handling system using the recovery operating system from the first non-volatile memory medium.

2. The information handling system of claim 1, wherein the data structure is stored in the second non-volatile memory medium and the first non-volatile memory medium comprises an external device.

3. The information handling system of claim 1, further comprising:
an interface coupled to the at least one processor;
wherein the interface is utilized to access the first non-volatile memory medium; and
wherein, to modify the configuration of the information handling system to prevent access of the first non-volatile memory medium, the instructions further cause the information handling system to prevent access to the interface.

4. The information handling system of claim 3, wherein the interface includes at least one of a peripheral component interconnect express (PCIe) interface of the information handling system, a serial advanced technology attachment (SATA) interface of the information handling system, a universal serial bus (USB) interface of the information handling system, a Thunderbolt interface of the information handling system, and a network interface of the information handling system.

5. The information handling system of claim 4,
wherein the interface includes the PCIe interface; and
wherein, to prevent access to the interface, the instructions further cause the information handling system to modify a configuration of a PCIe root complex of the information handling system or modify a configuration of a PCIe switch of the information handling system.

6. The information handling system of claim 1, further comprising:
a port coupled to the at least one processor;
wherein the port is utilized to access the first non-volatile memory medium; and
wherein, to modify the configuration of the information handling system to prevent access of the first non-volatile memory medium, the instructions further cause the information handling system to prevent access to the port.

7. The information handling system of claim 6, wherein the port includes at least one of a serial advanced technology attachment (SATA) port, a peripheral component interconnect express (PCIe) port, a universal serial bus (USB) port, a Thunderbolt port, and an Ethernet port.

8. A method, comprising:
installing a recovery operating system on a first non-volatile memory medium associated with an information handling system;
storing a second operating system and a data structure comprising information associated with a plurality of possible errors of a boot sequence in a second non-volatile memory medium of the information handling system, wherein the information associated with a plurality of possible errors include information corresponding to a corruption of a primary OS image for a secure boot failure, a plurality of boot attempts associated with an impediment to booting from a primary boot device, and a plurality of consecutive non-maskable interrupts (NMIs) associated with a primary boot device;
modifying a configuration of the information handling system to prevent access of the first non-volatile memory medium, wherein the first non-volatile memory medium is not discoverable via a search;
starting a power on self test (POST) by the second operating system, wherein the second operating system is configured to boot the information handling system from a second non-volatile memory medium of the information handling system;
determining that at least one issue associated with a boot sequence has occurred, the at least one issue comprising a secure boot failure, a hang, or a non-maskable interrupt (NMI) associated with the second non-volatile memory medium;
determining if information associated with the at least one issue matches information associated with an error of the plurality of possible errors stored in the data structure;
if the at least one issue does not match information associated with an error of the plurality of possible errors stored in the data structure, providing issue information; and
information associated with the issue matches the information associated with a corruption of the primary OS, the number of boot attempts matches the plurality of boot attempts associated with an impediment to booting from a primary boot device or a number of consecutive NMIs matches the plurality of consecutive non-maskable interrupts (NMIs) associated with the primary boot device stored in the data structure:
modifying the configuration of the information handling system to provide access of the first non-volatile memory medium;
modifying the configuration of the information handling system to boot the information handling system using the recovery operating system from the first non-volatile memory medium;
restarting the information handling system;
accessing the recovery operating system from the first non-volatile memory medium; and
rebooting the information handling system using the recovery operating system from the first non-volatile memory medium.

9. The method of claim 8, wherein the data structure is stored in the second non-volatile memory medium and the first non-volatile memory medium comprises an external device.

10. The method of claim 8, wherein the modifying the configuration of the information handling system to prevent access of the first non-volatile memory medium includes preventing access to an interface of the information handling system that is utilized to access the first non-volatile memory medium.

11. The method of claim 10, wherein the interface includes at least one of a peripheral component interconnect express (PCIe) interface of the information handling system, a serial advanced technology attachment (SATA) interface of the information handling system, a universal serial bus (USB) interface of the information handling system, a Thunderbolt interface of the information handling system, and a network interface of the information handling system.

12. The method of claim 11,
wherein the interface includes the PCIe interface; and
wherein the preventing access to the interface of the information handling system that is utilized to access the first non-volatile memory medium includes at least one of modifying a configuration of a PCIe root complex of the information handling system and modifying a configuration of a PCIe switch of the information handling system.

13. The method of claim 8, wherein the modifying the configuration of the information handling system to prevent access of the first non-volatile memory medium includes preventing access to a port of the information handling system utilized to access the first non-volatile memory medium.

14. The method of claim 13, wherein the port includes at least one of a serial advanced technology attachment (SATA) port, a peripheral component interconnect express (PCIe) port, a universal serial bus (USB) port, a Thunderbolt port, and an Ethernet port.

15. A computer-readable non-transitory memory medium that includes instructions that, when executed by at least one processor of an information handling system, cause the information handling system to:
   install a recovery operating system on a first non-volatile memory medium associated with the information handling system;
   store a second operating system and a data structure comprising information associated with a plurality of possible errors of a boot sequence in a second non-volatile memory medium of the information handling system, wherein the information associated with a plurality of possible errors include information corresponding to a corruption of a primary OS image for a secure boot failure, a plurality of boot attempts associated with an impediment to booting from a primary boot device, and a plurality of consecutive non-maskable interrupts (NMIs) associated with a primary boot device;
   modify a configuration of the information handling system to prevent access of the first non-volatile memory medium, wherein the first non-volatile memory medium is not discoverable via a search;
   start a power on self test (POST) by the second operating system, wherein the second operating system is configured to boot the information handling system from the second non-volatile memory medium of the information handling system;
   determine that at least one issue associated with a boot sequence has occurred, the at least one issue comprising a secure boot failure, a hang, or consecutive non-maskable interrupts (NMIs) associated with the second non-volatile memory medium;
   determine if information associated with the at least one issue matches information associated with an error of the plurality of possible errors stored in the data structure;
   if the at least one issue does not match information associated with an error of the plurality of possible errors stored in the data structure, provide issue information; and
   information associated with the issue matches the information associated with a corruption of the primary OS, the number of boot attempts matches the plurality of boot attempts associated with an impediment to booting from a primary boot device or a number of consecutive NMIs matches the plurality of consecutive non-maskable interrupts (NMIs) associated with the primary boot device stored in the data structure:
   modify the configuration of the information handling system to provide access of the first non-volatile memory medium;
   modify the configuration of the information handling system to boot the information handling system using the recovery operating system from the first non-volatile memory medium;
   restart the information handling system;
   access the recovery operating system from the first non-volatile memory medium; and
   reboot the information handling system using the recovery operating system from the first non-volatile memory medium.

16. The computer-readable non-transitory memory medium of claim 1, wherein, to modify the configuration of the information handling system to prevent access of the first non-volatile memory medium, the instructions further cause the information handling system to prevent access to an interface of the information handling system that is utilized to access the first non-volatile memory medium.

17. The computer-readable non-transitory memory medium of claim 16, wherein the interface includes at least one of a peripheral component interconnect express (PCIe) interface of the information handling system, a serial advanced technology attachment (SATA) interface of the information handling system, a universal serial bus (USB) interface of the information handling system, a Thunderbolt interface of the information handling system, and a network interface of the information handling system.

18. The computer-readable non-transitory memory medium of claim 17, wherein, to prevent access to the interface, the instructions further cause the information handling system to modify a configuration of a PCIe root complex of the information handling system or modify a configuration of a PCIe switch of the information handling system.

19. The computer-readable non-transitory memory medium of claim 1, wherein, to modify the configuration of the information handling system to prevent access of the first non-volatile memory medium, the instructions further cause the information handling system to prevent access to a port of the information handling system utilized to access the first non-volatile memory medium.

20. The computer-readable non-transitory memory medium of claim 19, wherein the port includes at least one of a serial advanced technology attachment (SATA) port, a peripheral component interconnect express (PCIe) port, a universal serial bus (USB) port, a Thunderbolt port, and an Ethernet port.

* * * * *